INVENTOR
Walter Trehearn Pattison
BY
ATTORNEY

Oct. 11, 1960 W. T. PATTISON 2,955,630
SCREW-DRIVING MACHINES
Filed Oct. 21, 1957 6 Sheets-Sheet 4

INVENTOR
Walter Trehearn Pattison
BY
ATTORNEY

Oct. 11, 1960            W. T. PATTISON            2,955,630
SCREW-DRIVING MACHINES Filed Oct. 21, 1957                          6 Sheets-Sheet 6

INVENTOR
Walter Trehearn Pattison
BY
Ayatso Dowell
ATTORNEY.

2,955,630
SCREW-DRIVING MACHINES

Walter Trehearn Pattison, Redditch, England, assignor to The Russell Auto-Feed Screwdrivers Limited, Birmingham, England, a British company Filed Oct. 21, 1957, Ser. No. 691,296

13 Claims. (Cl. 144—32)

This invention relates to screw driving machines of the kind comprising a hopper for containing a plurality of screws to be driven, a screw delivery nozzle, a rotary screw driving spindle assembled co-axially therewith and movable axially therein to engage with and drive screws delivered to such nozzle, guide means leading from the hopper to the nozzle and a delivery control device associated with the guide means for regulating delivery of screws to the nozzle.

The present invention is concerned specifically with the guide means leading from the hopper to the nozzle and with the delivery control device for regulating the delivery of screws to the nozzle.

Screw driving machines of the afore-mentioned kind have hitherto been constructed and adapted to operate in a satisfactory manner when used with screws whereof the overall length is appreciably greater than the diameter of the head, but such machines do not invariably operate satisfactorily with "difficult" screws.

The first factor which renders a screw "difficult" is when its length is less than twice the diameter of its head. The second factor rendering a screw "difficult" is when the centre of gravity of the screw lies within the head or at only a short distance down the shank so that the restoring forces acting to restore the screw to its proper position upon angular displacement therefrom are small. A third factor which renders a screw "difficult" is when the head of the screw has a height which approximates to its diameter so that the head room which must necessarily be left in any guide passageway adapted to permit of the travel of the head with the shank of the screw depending in a slot from the bottom of the passageway must necessarily be sufficiently great that it inherently permits of angular displacement of the head and hence of the whole screw in a vertical plane passing through the centre line of the guide slot.

In the case of some screws all these factors may be present.

The general object of the present invention is to ensure, so far as possible, the proper delivery of the screws along the guide means under the control of the delivery control device to the nozzle even though such screws may incorporate one or more of the physical characteristics referred to above, rendering them "difficult."

In particular to further object of the invention is to provide an improved form of delivery control device. Hitherto such devices have comprised a downwardly inclined chute member having a guide-slot communicating at its inlet end with an outlet in the hopper towards which the screws are urged by the operation of a feed means, this guide-slot being of a width to allow the shanks of screws to depend therethrough whilst the under faces of their heads are supported by the margins of the chute member, there being associated with such chute member an escapement device comprising an oscillatory escapement member having escapement and arresting fingers extending across the guide-slot from opposite edges and spaced apart lengthwise thereof by a distance approximating to the diameter of the screws to be fed, the free ends of these fingers being so positioned relatively to each other that as the arresting finger is withdrawn the escapement finger moves across the guide-slot, the screws previously barred by the arresting finger being free to travel towards the outlet of the guide-slot which movement is effected or permitted by a cam face at the trailing edge of the escapement finger while the leading edge of this finger serves temporarily to prevent the onward passage of further screws along the guide slot.

Engagement of the shank of the screw at axially spaced positions by the escapement and arresting fingers in the operation of the escapement member inherently tends to impart angular displacement to the screws in a vertical plane passing through the centre of the guide-slot, and it is not always possible completely to prevent the occurrence of such angular displacement merely by controlling closely the amount of head room in the passageway above the guide-slot.

Specifically, therefore, one of the objects of the invention is to eliminate or reduce this inherent tendency to angular displacement by adoption of an improved form of escapement device wherein the escapement member does not tend to impart such angular displacement or only does so to a reduced extent.

Another specific object of the invention is to provide means whereby the amount of head room may be precisely controlled thereby providing a further safeguard against angular displacement of the screw in progression along the passageway above the guide-slot.

In the conventional construction and arrangement of escapment device above referred to the arresting finger of the escapement member has been arranged to be withdrawn in a direction endwise of its length, and transversely of the length of the guide-slot, from an initial position which it occupies across the guide-slot in advancement of an enlargement thereof, such enlargement constituting an outlet in register with the upper end of the guide-means leading from the hopper to the nozzle. In this operated or withdrawn position of the arresting finger the escapement finger moves from an initial position in which it does not overlap with any part of the guide-slot to an operated position in which it extends crosswise of the guide-slot to effect, by means of its cam face, advancement of its screw along the guide-slot.

It will therefore be apparent that such screw must undergo a bodily displacement lengthwise of the guide slot equal at least to the radius of the shank diameter of the screw plus the radius of the enlargement whilst unsupported by the arresting finger, (assuming that at the time at which the arresting finger is completely withdrawn the screw will occupy a position at the end of the guide-slot, but not within the enlargement), at this time its shank is engaged solely by the escapement finger.

Since during the subsequent movement of the screw lengthwise of the guide-slot the support afforded by the marginal portions of the chute member will be discontinued (because the screw is moving into the enlargement) there will, at this particular time, be a much greater risk of angular displacement of the screw in a vertical plane so that there is considerable danger that it will be angularly displaced and become jammed in the upper part of the guide means beneath the chute member.

A further specific object of the present invention is to avoid or reduce this possibility, in particular by the provision of an arresting finger adapted and arranged to provide better support for the screw during its passage into the enlargement, and by contriving release of such support at a later stage than has hitherto been the case so that the time during which the screw is entirely unsupported by the arresting finger is materially reduced.

The invention is further specifically concerned with the guide means provided below the delivery control device. In conventional constructions of screw driving machines of the kind herein referred to, the hopper is in the form of a circular flanged tray which is assembled about an input spindle of the machine arranged co-axially with the screw driving spindle and is connected thereto by a torque limiting clutch. The whole of this assembly, which also includes the upper part of the guide means, leads from an outlet in the hopper which is movable vertically relatively to the nozzle assembly which includes a lower part of the guide means. Relative vertical movement between the upper and lower parts of the guide means takes place between each screw driving operation and serves to bring a portion of the upper part of the guide means (normally termed the deflection tube) into the mouth of the upper portion of the lower part of the guide means (normally termed the delivery tube) at which time the screw is transferred from the upper part to the lower part thereof.

To effect or promote movement of the screws in the hopper towards the outlet thereof the hopper is caused to move bodily in a circular path so that its centre travels around the axis of the input spindle without the hopper itself actually rotating about its own centre. In consequence the deflection tube traces out a conical surface the apex being at the lower end and co-incident with the centre of the mouth of the delivery tube.

It is thus necessary for the deflection tube at its upper end to be connected to the next succeeding upper part of the guide means by a joint which permits of this movement in a conical surface of the deflection tube and hitherto the joint has comprised a frusto conical or trumpet shaped portion at the upper end of the deflection tube which is retained in overlapped relation with the next succeeding upper part of the guide means, this being in the form of a tube projecting into the frusto-conical or trumpet-shaped mouth.

This construction is satisfactory for screws of overall length appreciably greater than the diameter of the head; it is not so satisfactory for "difficult" screws.

The enlargement of the cross section of the passageway which is afforded by the frusto-conical or trumpet-shaped part of the deflection tube is sufficient to allow such screws to become displaced angularly so that their axes are no longer co-incident, or substantially co-incident, with the axis of the passageway formed by the deflection tube and the next succeeding upper part of the guide means, and such screws sometimes become jammed transversely or even inverted.

A further specific object of the invention is to provide a joint of new or improved construction between the deflection tube or lower guide member and the next succeeding upper portion of the guide means or upper guide member, which joint will permit of the tracing out of a conical path by the deflection tube or lower guide member, such as is necessary during operation of the machine, without affording such extensive lateral enlargement of the passageway internally as will permit screws to become jammed or inverted, even though such screws may be rendered "difficult" by incorporation of another of the factors previously referred to.

The invention further concerns the part of the guide means disposed immediately below the hopper or upper guide member as referred to in the preceding paragraph.

In the known construction of machine previously referred to this upper guide member has comprised a tube comprising a tubular portion of part circular form occupying more than 180°, the free edges of this tubular portion having extending therefrom a pair of spaced parallel plates between which a filler member, herein termed a baffle member, is mounted. The form and mounting of the baffle member has hitherto been such as to permit of the adjustment of the baffle member between the plates for the purpose of varying the effective cross sectional dimensions of the passageway afforded by the tubular portion, but the inwardly presented face of the baffle member has not conformed to the cross sectional shape internally of the tubular portion. The resulting lateral enlargement of the passageway which will exist co-incident with the margins of the baffle member involves the risk of screws passing down the passageway becoming jammed, or inverted, on approaching the joint between the deflection tube and the upper guide member.

A further object of the invention is to avoid or reduce this possibility.

A specific embodiment of the invention will now be described by way of example with reference to the accompanying drawings wherein.

Figure 1:
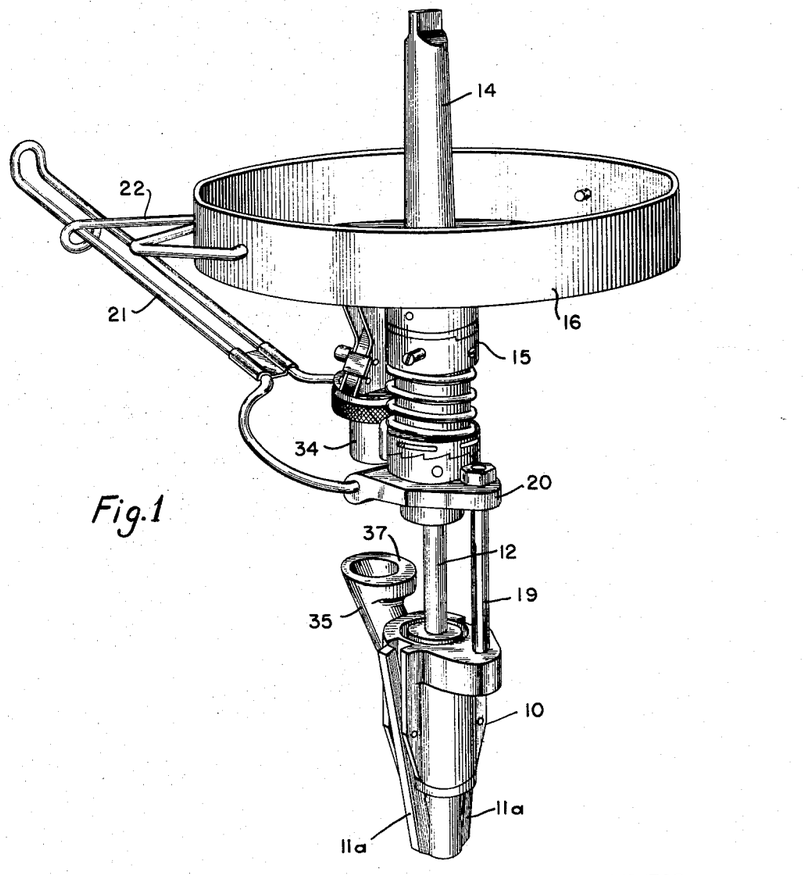
Figure 1 is a perspective view of one construction of screw driving machine in accordance with the invention.
Figure 2:
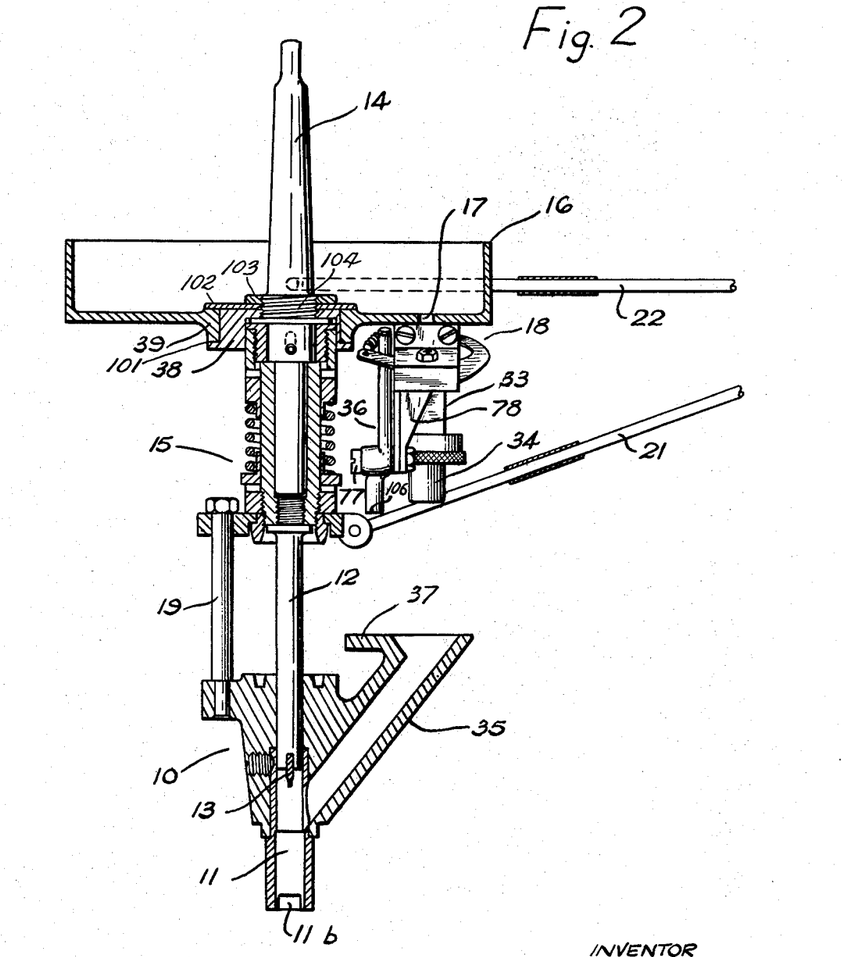
Figure 2 is a view in side elevation and in diametral cross section of the same construction.

Referring firstly to Figures 1 and 2 which illustrate the screw driving machine as a whole. This comprises a delivery nozzle assembly 10 affording a downwardly extending bore 11 for the passage of screws therethrough point first. A screw driving spindle 12 rotatably in the bore 11 co-axially thereof and also movable axially of the bore. The screw driving spindle 12 is provided with a screw driving bit 13 and is driven by means of an input spindle 14 through the intermediary of a torque limiting clutch and indicated generally at 15, the operation of which is more fully described in my co-pending application No. 691,353 entitled "Improvements relating to screw driving machines" filed upon the same date as the present application and to which reference may be had for the details of construction and manner of operation of the torque limiting clutch.

Screws are fed to the nozzle 10 from a hopper 16 conveniently in the form of a circular peripherally flanged tray encircling the input spindle 14 and having a spirally arranged slot 17 in its base leading to the inlet of a delivery control device 18. Premature delivery of screws from the lower or discharge end of the nozzle 11 is prevented by outwardly displaceable but inwardly urged jaws 11a provided at their lower ends with inwardly projecting abutments 11b for engaging beneath the head of a screw disposed in the nozzle 11 ready for driving in but prior to engagement by the screw driving bit 13.

The nozzle assembly 10 is adapted to be retained against rotation relatively to the spindles 12 and 14 by a guide post 19 slidably passing through a guide plate 20 carrying a radially projecting arm 21 which will, in operation of the machine, be brought into engagement with the pillar or upstanding post of a drilling machine with which the screw driving machine is intended to be used. The hopper 16 in anchored by means of a laterally projecting arm 22 to the arm 21.

Screws are delivered from the hopper 16 to the nozzle assembly 10 by a guide means comprising an upper part indicated generally at 33 terminating in a deflection tube 34 adapted to be brought into engagement with a lower part of the guide means indicated generally at 35 during a screw driving operation involving axial movement of the screw driving spindle downward along the bore 11, in order to deliver a screw into the lower part 35 of the guide means ready for the next screw driving operation.

Concurrently with this stage in the operation of the machine the delivery control device 18 is operated by means of a driving lever 36, the lower end of which is brought into contact with a stop or platform 37 on the lower part of the guide means so that a single screw descends the passageway afforded by the upper and lower parts of the guide means during each screw driving operation and is thus ready to be engaged by the bit 13 of the spindle during the subsequent screw driving operation.

Figures 11, 12:
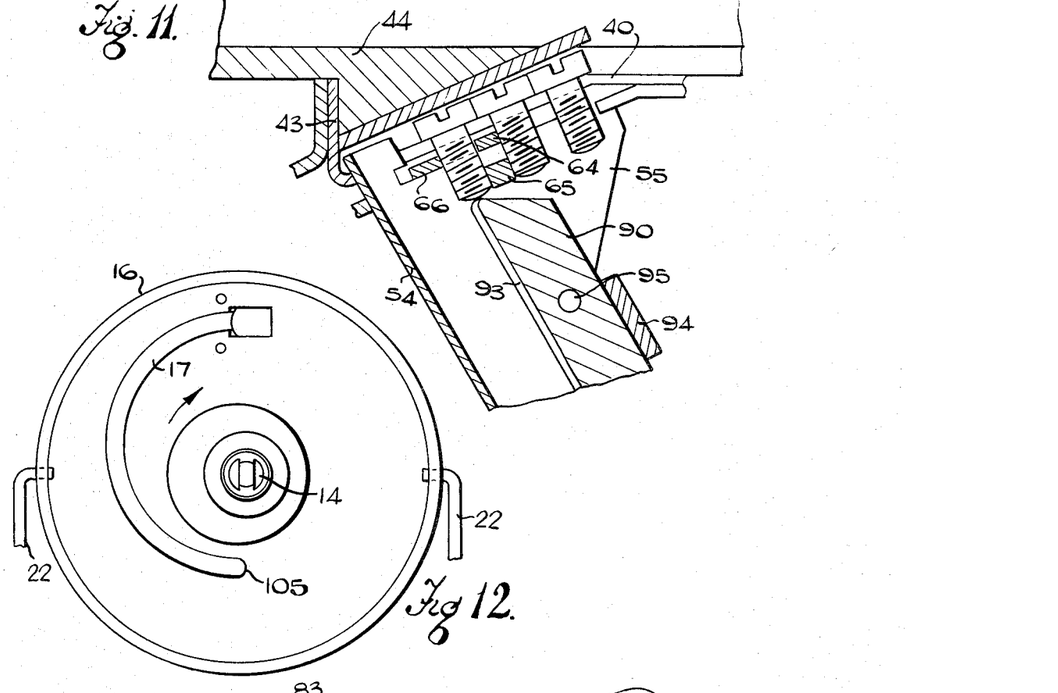
Figure 11 is a view of the delivery control device on an enlarged scale in comparison with Figure 2 and in vertical cross section through the centre of the guide slot afforded by such device.
Figure 12 is a plan view of the machine showing the slot in the base of the hopper.

A certain number of the screws placed in a loose mass in the hopper will take up a position in the slot 17, their shanks extending downward through this slot and their heads resting on the margins of the hopper base bordering on the edges of the slot. An eccentric circular motion is imparted to the hopper 16 which is retained against rotation about its own axis by means of the arms 21 and 22, and this causes a circular sifting motion to be imparted to the screws in a direction indicated by the arrow (Figure 12). The eccentric circular motion is produced by a bushing 38 keyed to the input spindle 14 and mounted in the bore of a boss 39 formed integrally in the base of the hopper. The boss 39 rests on a radially extending flange 101 at the lower end of the eccentric bushing 38 and is retained against upward displacement by a washer plate 102 and internally threaded ring 103 screwing on to the portion 104 of the spindle 14.

The spindle 14 will normally be rotated clockwise (when driving screws having right-hand threads) and consequently the eccentric motion imparted to the hopper 16 by the eccentric bushing 38 is also clockwise.

The spindle 14 is normally rotated at about 600 r.p.m. or thereabouts and at this speed the inertia of the mass of screws in the hopper is such that they tend to slip relatively to the base thereof to some extent, so that relatively to the base of the hopper the screws undergo the circular sifting motion previously mentioned. During part of each eccentric revolution of the hopper this relative motion will tend to advance the screws along the slot 17 in the direction of the arrow. At this time the screws tend to be moved away from the trailing or blind end 105 of the slot 17 toward the other end at which the delivery control device is situated, there being an outlet to the slot at this last mentioned end so that the screws do in fact progress along the slot in this direction. Further screws will enter the slot adjacent to the blind end 105 under the influence of gravity to fill the vacant space left at this end of the slot in consequence of advancement of the screws. During a further part of the eccentric motion of the hopper when the screws in the slot would tend to be moved backwardly toward the blind end the latter and the additional screws which have filled the vacant spaces positively prevent reversed movement of the screws along the slot, so that it will be apparent that the overall motion of the screws is one of advancement in the direction of the arrow.

Thus far described the machine is of conventional construction and the foregoing general description is intended to assist a proper understanding of the improvements forming the subject of the invention hereinafter described in greater detail.

Referring particularly to the delivery control device as illustrated in Figures 3 to 7 of the drawings the slot 17 in the base of the hopper 16 is of such width that the shanks of screws can depend through this slot whilst their heads are supported by the marginal portions of the hopper base bordering on such slot.

Figure 3:
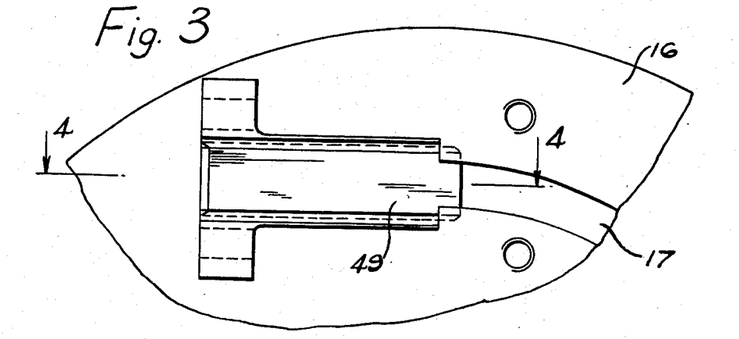
Figure 3 is a fragmentary view of the underside of the hopper, certain parts of the delivery control device having been removed to illustrate the position of an assembled and removable slip plate for controlling the head room in the passageway above a chute member incorporated in the delivery control device.
Figure 4:
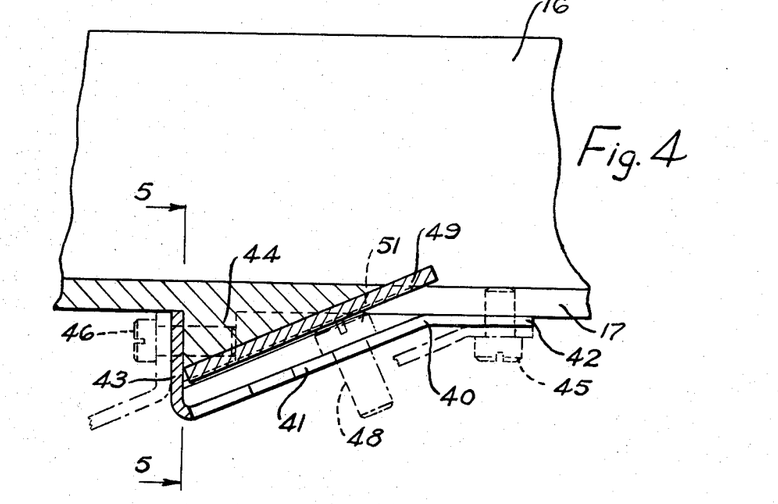
Figure 4 is a fragmentary view in side elevation and cross section on the line 4—4 Figure 3.

At the outer end of the slot 17 which preferably extends from a position near to the centre of the hopper base, that is to say just outwardly of the boss 39 to a position near the periphery of the base as seen particularly in Figures 3 and 12 is secured beneath the base of the hopper a chute member in the form of a chute plate 40, the main portion 41 of which plate inclines downwardly with respect to the hopper base, the ends of this chute plate including two attachment portions 42 and 43, which are horizontal and vertical respectively and are secured to the hopper base and to a downward projection 44 at the underside of the base respectively by means of screws 45 and 46, shown in chain lines in Figure 4 and entering tapped holes in the base of the hopper and in the projection 44.

The chute plate 41 is formed with a guide-slot 47 (Figure 5) which is a continuation of the slot 17 and screws such as that indicated in broken lines at 48 (Figure 4) can thus pass in a single file down the guide-slot 47 with their heads supported by the margins thereof bordering on the slot and their shanks depending in a downwardly inclining manner as illustrated.

In combination with the chute plate 41 is provided a top wall member of predetermined thickness and cross sectional shape herein referred to as a slip plate and indicated at 49. The chute plate 40, particularly the downwardly inclining portion thereof 41, in combination with the plate 49, define a guide passageway 50 for the heads 51 of screws such as the screw 48. The height of this passageway, that is to say head room or spacing between the upper surface of the portion 41 of the chute plate and the under surface of the slip plate 49, being such as to allow the screws to move freely down this passageway whilst preventing them from turning angularly in a vertical plane passing through the axes of the shanks of the screws.

With certain types of screws, hereinbefore referred to as "difficult" screws there is inherently little or no restoring force (apart from that afforded by engagement of the screw head with the plate 49 and portion 41 of the chute plate) to such angular deflection because the centre of gravity of the screws may lie within the head or only just below the head. Further, the head itself may be high relatively to its diameter so that any appreciable clearance between the top face of the head of the screw and the underface of the plate 49 would allow the head to turn in the passageway 50 about a horizontal axis transverse to the length of the passageway.

In accordance with one feature of the invention the plate 49 is made as a structurally separate part which can readily be removed from assembly with the other members of the structure defining the passageway 50, and replaced by another plate having a different thickness or different shape of underface 52, as seen in transverse cross section, affording only just sufficient clearance with respect to the screw heads to allow these to move freely down the passageway 50, but not sufficient clearance to permit of unwanted angular deflection in the manner described.

Conveniently the lateral edges 53 of the plate 49 are inclined so that, as a whole, it is of trapezoidal cross section and is received in a dove-tailed groove at the underside of the projection 44 of the base of the hopper.

The plate 49 is slidably engaged in the groove, and can be removed and replaced as required. It is preferred that the portion of the slip plate nearest its upper end shall be slightly wider than the remainder so as to be retained frictionally in the groove during the operation of the machine.

The underface 52 of the plate 49 conforms in cross sectional shape to the top face of the screws, the form illustrated being applicable to screws having generally cylindrical heads, but it will be understood that it may be varied as required so as to afford an underface of part circular or other arcuate shape in transverse cross section, for example when the machine is required to be used with screws the heads of which are of domed form.

The feed control device further comprises an escapement device operating in combination with the structure defining the guide passageway 50.

It will be convenient to refer firstly to the upper part of the guide means disposed immediately beneath the chute plate for receiving screws upon discharge from the outlet of the chute plate. The upper part of the guide means (Figures 6 to 10) comprises a tube including a tubular portion 54 and a pair of spaced parallel plates 55, these parts at their upper ends being fixed in any suitable manner, for example by welding or soldering to a flange plate 56, all these parts conveniently being made as sheet metal pressings, for example of mild steel.

At one end the flange plate 56 is bent upwardly as indicated at 57 and then parallel again to its main portion as indicated at 58 and finally upwardly again at 59, the portion 59 being formed with a screw hole to enable it to be secured to the projection 44 by means of the same screws 46 as retain the chute plate. At its opposite end the flange plate 56 includes a horizontal attachment portion 60 having screw holes for the passage therethrough of the screws 45.

The inclined portion 41 of the chute plate incorporates near its lower end an enlargement 61 of generally circular form communicating with the slot 47 and of somewhat enlarged diameter around half its circumference remote from the slot 47, to accommodate an upwardly projecting extension 62 of the tubular portion 54, this extension being a semi-cylindrical shell. The remaining portion of the circumference of the enlargement 61 is of a diameter equal to the internal diameter of the tube 54 so that effectively the aperture afforded by the enlargement is of the same diameter as the internal diameter of the tube.

In association with the portion 41 of the chute plate is an escapement member 63 having upper and lower escapement finger elements 64 and 65 and an arresting finger 66, this escapement member being pivotally mounted for oscillation on a bolt 67 extending through the doubled over portion 58 of the flange plate, a suitable washer or distance piece 68 being disposed between the portion 58 of the flange plate and the underlying portion thereof.

The upper escapement finger element 64 is disposed and operates above the flange plate 56 and beneath the inclined portion 41 of the chute plate, whilst the lower escapement finger element 65 is disposed and operates below the flange plate 56 through apertures such as that seen at 69 in the plates 55.

The provision of upper and lower escapement finger elements ensures that the shanks of screws such as the screw 48 disposed in the passageway 50 are engaged at two axially spaced positions on their shanks by the cam faces constituted by the trailing edges of the escapement finger elements such as that indicated at 70. The first of these positions of engagement is situated immediately adjacent to the under face of the head 51 of the screw and the other position of engagement at some distance down the shank.

The shank of the screw is also engaged at the same level as that of the upper escapement finger element by the arresting finger 66, firstly by its leading edge 71 then by a bevelled edge portion 72 and finally by the end edge 73. The resultant three point engagement of the shank of the screw by the escapement finger elements and the arresting finger is effective to guide against the possibility of angular deflection of the screw in a vertical plane whilst this is being moved down the guide-slot and passageway under the action of the cam faces 70 at the trailing edges of the escapement finger elements.

Conveniently the lower escapement finger element 65 is formed as a part which is structurally separate from the remainder of the escapement member 63. The escapement finger element 65 may be secured in position by means of screws 74 entering tapped holes in the element 65 which is spaced from the parting finger element 64 by a distance piece 75.

Hitherto only a single escapement finger has been employed and consequently the three point engagement which contributes to the angular stability of the screws has been lacking.

A further feature of the construction is that the arresting finger 66 is appreciably wider relatively to the transverse dimensions of the guide-slot 47 and enlargement 61 thereof, than has hitherto been the case, and instead of occupying a position across the guide-slot adjacent to the enlargement 61 the arresting finger is disposed in overlapped arrangement with the enlargement preferably adjacent to the guide-slot 47.

By making the arresting finger 66 of this width the end edge 73 is appreciably longer than usual and this ensures that, as the finger is withdrawn arcuately in a direction generally transverse to the length of the guide-slot 47, the support afforded to the underface of a screw head by the marginal portion of the finger element 66 bordering on the edge 73, is continued for a longer period of time than usual.

Initially the screw is engaged at its shank by the arresting edge 71, and the under face of the head receives support from the marginal portion bordering on this edge, but, during withdrawal movement of the arresting finger element, this support is withdrawn and replaced by support from the marginal portion of the arresting finger bordering on the end edge 73. This change takes place whilst the screw is actually moving into the enlargement 61.

Thus, even when the arresting finger element is withdrawn so that the margin bordering on the end edge 73 occupies the lateral margin of the enlargement 61, some support is still afforded to the screw immediately prior to its descent of the passageway of the tubular portion 54. In effect the screw does not have to undergo any translatory movement within the passageway 50 including the enlargement 61 without being supported in some way by the combination of escapement and arresting finger elements.

Control as to the angular position of the screw is therefore much more complete than in a conventional arrangement, wherein all support for the underface of the head is discontinued during movement of the screw into the enlargement 61.

For effecting oscillatory movement of the escapement member 63 a driving lever 36 is provided which can oscillate in a vertical plane by virtue of its pivotal mounting on a screw 77 secured to a dependent channel section lug 78 of the flange plate 56. The upper end 79 of the driving lever is engaged between a displaceable relief lever 80 and an edge portion 81 of the escapement member.

Figure 6:
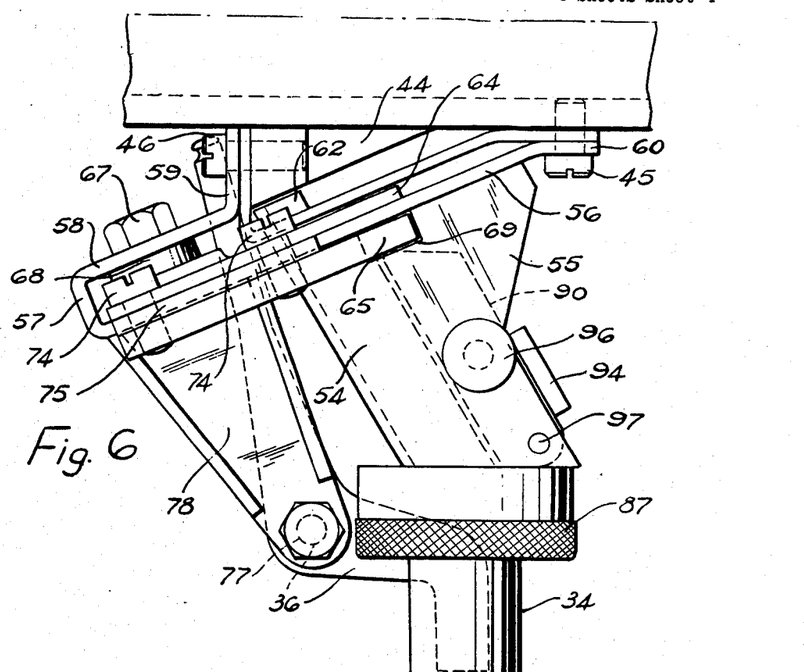
Figure 6 is a fragmentary view in side elevation illustrating the upper part of the guide means comprising the deflection tube, upper guide member and associated delivery control device.

The driving lever 36 is caused to rotate in a clockwise direction as seen in Figure 6 when its lower end 106 is brought into contact with the upwardly presented stop or platform 37. This occurs whenever the machine as a whole is lowered by downward feed movement of the spindle of the drill press, in which the spindle 14 is carried, and is effected by the operator for the purpose of applying a screw temporarily held by the abutments 11b of the nozzle 11 to the work into which it is to be driven. The nozzle 11 engages the work and is thus restrained against further downward displacement, but the screw-driving spindle 12 moves down the bore of the nozzle by virtue of the continued downward bodily displacement of the assembly comprising the driving spindle 14, the hopper 16, and the delivery control device 18. It is this operation which brings the end 106 of the driving lever 36 into contact with the stop or platform portion 37, whereby the driving lever imparts the requisite movement to the escapement member to cause a screw to be moved into the enlargement 61 and then discharged down the guide means 33, 34, and 35 so as to reach a position alongside the screwdriving spindle 12 which will, at this time, be blocking the lower end of the guide means 35. It will be evident, therefore, that upon raising of the drill press spindle and retraction of the screwdriving spindle to the position illustrated in Figure 2, this screw can descend gravitationally into the nozzle 11 to be retained by the abutments 11b ready for the next screwdriving operation.

Figure 5:
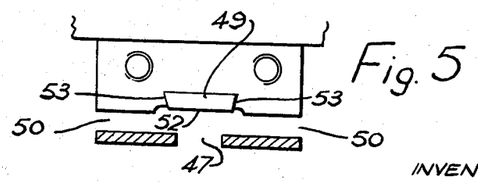
Figure 5 is a fragmentary view in cross section on the line 5—5 Figure 4.
Figure 5A:
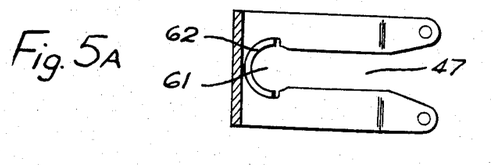
Figure 5a is a top plan view of the chute plate.
Figure 7:
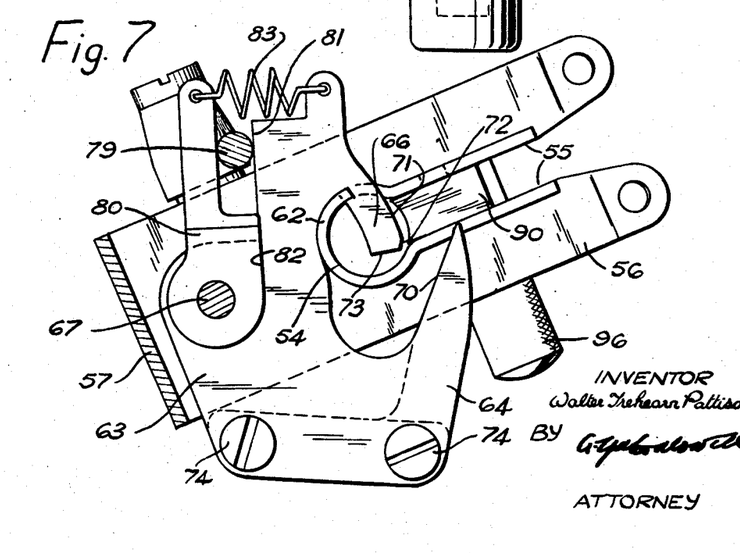
Figure 7 is a fragmentary plan view of the delivery control device removed from the underside of the hopper.
Figure 13:
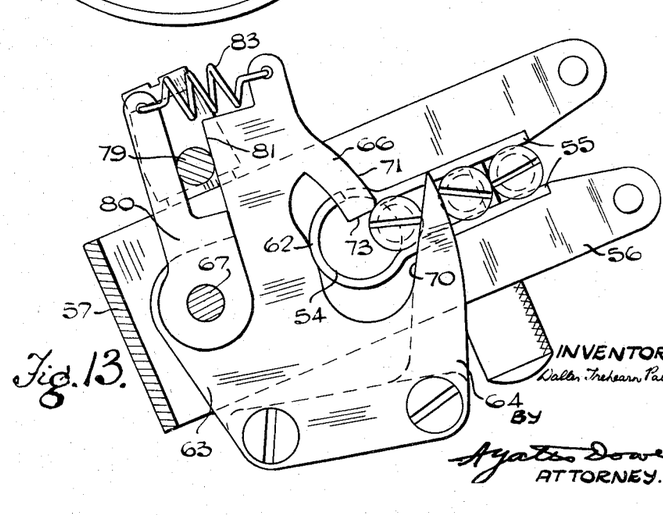
Figure 13 is a view similar to Figure 7 showing the escapement member in a position intermediate the extremities of its range of oscillation, and a screw engaged between the arresting finger and the escapement finger elements in transit between the parallel sided part of the guide slot and the enlargement thereof at the end from which screws are ultimately released for delivery to the nozzle assembly of the machine.

The purpose of the relief lever 80 is to prevent damage to the escapement member and to the parts of the delivery control device 18 through application to the escapement member of the relatively strong deflecting force which will be exerted thereon by the driving lever 36 in the event of angular movement of the escapement member being obstructed in moving from its initial position (as seen in Figure 7) towards an operated position (as seen in Figure 13), for example if the leading ends of the escapement finger elements should happen to engage the shank of a screw exactly at the end of a diameter through the shank of the screw or if the screw should for any cause have become jammed in the passage 50 (Figure 5).

The relief lever 80 is pivotally mounted on the bolt 67 and is normally held with an abutment face constituted by its edge 82 in contact with a portion of the edge 81 of the escapement member by means of a tension spring 83. If, however, the escapement member encounters positive obstruction in moving from its initial position (as seen in Figure 7) towards an operated position (as seen in Figure 13) in which the escapement finger elements extend crosswise of the guide-slot 47, then the relief lever can turn on the bolt 67, the edges 82 and 81 separating from each other and the spring 83 being extended.

Referring now more particularly to the upper part of the guide means indicated by the general reference 33 this upper part comprises the tube incorporating the tubular portion 54 and plates 55 previously referred to constituting an upper guide member and also a lower guide member in the form of the deflection tube 34.

Figures 8, 9, 10:
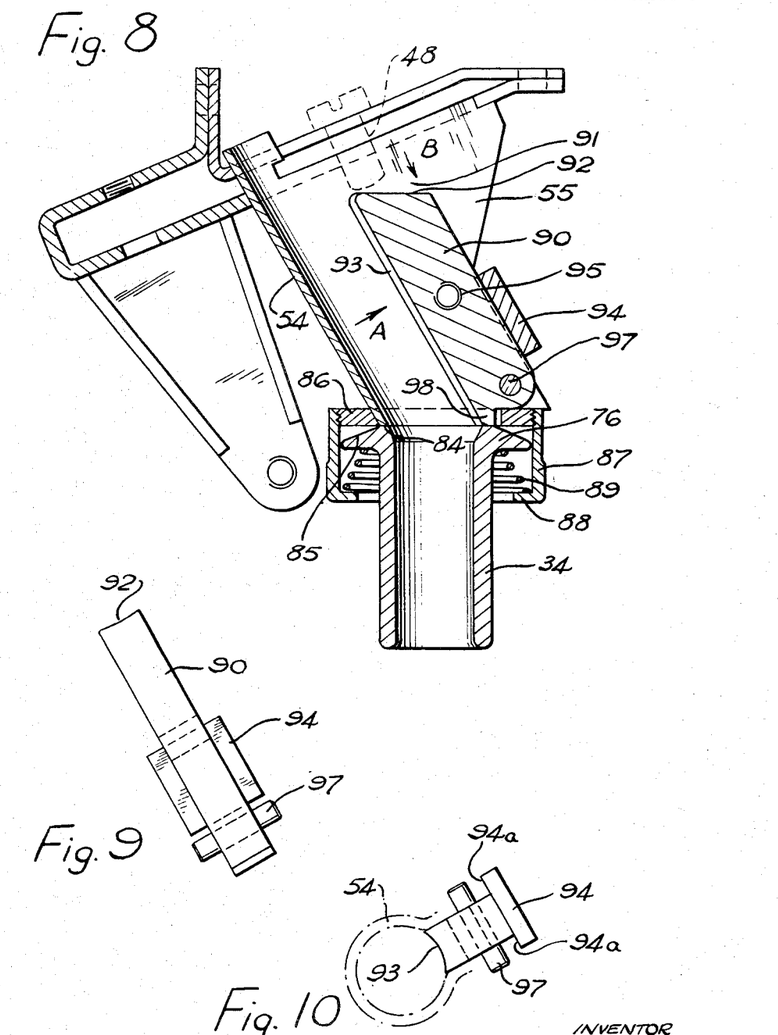
Figure 8 is a view similar to Figure 6 but in vertical cross section on the centre line of the passageway afforded by the upper part of the guide means.
Figure 9 is a fragmentary view of the baffle looking from the arrow A in Figure 8.
Figure 10 is a view of the baffle member looking in the direction of the arrow B of Figure 8, its relationship with the tubular portion of the upper guide member being indicated in chain lines.

For the purpose of the following description reference is had particularly to Figure 8 in which the tubular portion 54 and the deflection tube 34 are shown in vertical section.

The deflection tube 34 is formed of a short length of tube, the internal diameter of which for nearly its whole length (except for a short portion at the upper end) is of a diameter equal to that of the tubular portion 54 internally and constitutes a continuation of the passageway afforded by the portion 54.

At its upper end the deflection tube 34 is formed with a head part 76 so that as a whole the deflection tube is of somewhat mushroom shape.

The upwardly presented face of the head part 76 as seen particularly in Figure 8 comprises a narrow annular inner portion 84 having a radial width, which typically may be about 1/16", and an outer portion 85 which may be of frusto-conical form, so that as a whole the upper face is of generally domed form.

Opposed to the face portion 84 is the lower end face of the tubular portion 54 which is constituted partly by a flange plate 86 and secured to the lower end of the portion 54 and partly by the lower end face of the portion 54 itself, which is flush with the lower face of the flange plate 86.

The plane in which the lower face of the flange plate 86 and the face portion 84 lies is perpendicular to the axis of the deflection tube 34 and oblique to the axis of the tubular portion 54, so that the mouth of the passageway afforded by the portion 54 is of elliptical or approximately elliptical form. The mouth of the passageway afforded by the deflection tube 34 at its upper end is of circular form and of enlarged diameter equal or approximately equal to the length of the major axis of the elliptical or approximately elliptical mouth of the portion 54, and is connected with the remainder of the deflection tube by a flared or bell-mouthed portion whereby no upwardly presented abutment or obstruction is presented internally of the assembly.

When angular movement of the deflection tube takes place (its axis tracing out a frusto conical surface) the deflection tube will tilt relatively to the tubular portion 54 about a horizontal axis which is a tangent to the outer edge of the annular face portion 84, this axis being close to the boundaries of the two mouths afforded by the passageways through the portion 54 and deflection tube 34 at their adjacent contacting ends, so that the deflection tube 34 and tubular portion 54 which respectively constitute lower and upper guide means are subjected to a collective gyration at their adjacent coupled ends, axes of their respective passageways being oblique to one another. The proximity of the axis about which such tilting takes place to the mouths of the passageways avoids presenting any unduly wide crescent-shaped opening in the passageway as a whole. Thus the risk of there being so extensive an enlargement of the passageway as will permit screws descending the passageway to become inverted or jammed crosswise of the passageway is materially reduced.

To maintain the two mouths in register with each other the flange plate 86 is threaded peripherally and an internally threaded sleeve 87 screws onto this flange plate, the sleeve at its lower end having an inturned rim or flange 88.

The head part 76 has a close sliding fit in the interior of the sleeve 87 which contains a coiled compression spring 89, preferably of frusto-conical form, and bearing against the end face of the head part 76 and against the flange or rim 88 to maintain the face portion 84 in contact with the end face of the tubular portion 54.

Referring now particularly to Figures 7, 8, 9 and 10. It will be observed that the tubular portion 54 affords an open side between the plates 55, and this open side is closed for nearly the whole of its length by a filler or baffle member 90.

Only a short gap or clearance space as indicated at 91 is left between the upper end of the baffle member and the flange plate 56, sufficient to allow the lower ends of the shanks of screws such as 48 to pass with clearance into alignment with the upper end of the passageway afforded by the tubular portion 54.

It is an advantageous feature of the baffle member 90 that the upper face 92 thereof is inclined, with respect to the path of movement of screws, such as 48, so that should the lower end of any particular screw (due for example to the shank being somewhat longer than the nominal length as a manufacturing tolerance) come into contact with the face 92 it will be deflected in a trailing manner and will pass over the peak at the inner end of this face, and will afterwards be restored to a position in which its axis is parallel to that of the passageway through the portion 54.

As seen particularly in Figure 10, the baffle member 90 has inwardly presented face 93 which is of part circular cross section and is substantially equal in radius of curvature to the internal curvature of the portion 54 indicated in chain lines in Figure 10.

The face 92 may also be of part circular or other arcuate cross section to minimize lateral deflection of any screws brought into contact therewith.

The baffle member 90 is preferably formed as a solid metal block. Mild steel may be utilised for this purpose or alternatively hard steel or other hard metal, in which case the faces 92 and 93 may be ground to the desired contour.

The baffle member is located between the plates 55 as to the radial position which it occupies, and as to the angular position which it occupies, in the plane parallel to the plates 55 by abutment means, preferably in the form of a transverse locating plate 94 secured to the baffle member in any suitable manner as for example by welding or brazing.

The inwardly presented shoulders 94a of this plate are adapted to engage with the edges of the plates 55 to provide the required radial and angular location for the baffle member.

The baffle member is retained in position by providing in it a tapped hole 95 which is provided with a clamping screw 96 (Figure 6) having an operating knob which is knurled to facilitate gripping, the clamping screw passing without clearance through a hole in one or both plates 55 in alignment with the tapped hole 95 so that it does not permit of any positional adjustment of the baffle member.

At its lower end the baffle member is pivotally mounted between the plates 55 by means of a pivot pin 97 which may have a tight fit in the baffle member and which can pivot in circular holes in the plates 55 so as to be movable, upon removal of the clamping screw 96, to an open position in which it is swung laterally outwardly about the axis of the pin 97. This exposes the passageway of the tubular portion 54 and permits of the ready extraction of, or restoration to proper positioning of, any screw which has become jammed in this passageway.

At its lower end the baffle member incorporates an integral lug 98, Figure 8, which fits in an aperture in the flange plate 86 and facilitates the rectification, or release, of any screw which may become jammed at the junction between the deflection tube and tubular portion 54, despite the reduced possibility of such an occurrence arising by virtue of the novel form of the head part 76.

It will be understood that baffle members 90 of different widths (measured in a direction radial to the axis of the passageway through the portion 54), may be provided. This enables the effective diameter of this passageway to be changed by replacement of one baffle member by another of a different width selected in accordance with the diameter of the heads of the screws to be used. Preferably the departure of the inwardly presented face 93 of the baffle member from truly cylindrical continuation the inner face of the portion 54 will be slight thereby minimizing departure from truly circular form of the passageway as a whole.

The improvements herein described contribute effectively to the reliable and consistent delivery of screws from the hopper to the upper end of the delivery tube 35 forming the lower part of the guide means.

The machine is thus adapted for reliable operation not only with "normal" screws but also wtih "difficult" screws having the characteristics previously referred to.

What I claim then is:

1. In a screw-driving machine of the kind comprising a hopper for containing a plurality of screws to be driven, a screw delivery nozzle, a rotary screw-driving spindle assembled co-axially therewith and movable axially therein to engage with and drive screws delivered to such nozzle, and guide means for the screws leading from the hopper to the nozzle, the provision of a delivery control device associated with the guide means for regulating the delivery of screws to the nozzle, and comprising a downwardly inclined chute member having a guide slot through which the shanks of screws can depend while the underfaces of their heads are supported by the margins of the chute member bordering on this guide slot, and having an outlet from said guide slot at one end thereof, and an escapement device comprising an arresting finger and an escapement finger spaced apart lengthwise of the guide slot, the escapement finger having at its trailing edge a cam face for promoting feed movement of a released screw towards the outlet, the cam face including a part disposed below the chute member, thereby to engage a screw shank at two positions spaced from the screw head, and provide in combination with the arresting finger positive control of the angular position of the so-engaged screw in a vertical plane through the axis of the shank.

2. In a screw-driving machine of the kind comprising a hopper for containing a plurality of screws to be driven, a screw delivery nozzle, a rotary screw-driving spindle assembled co-axially therewith and movable axially therein to engage with and drive screws delivered to such nozzle, and guide means for the screws leading from the hopper to the nozzle, comprising a tube having at its upper end an outwardly projecting flange, the provision of a delivery control device associated with the tube for regulating the delivery of screws through it to the nozzle, and comprising a downwardly inclined chute member mounted in spaced generally parallel relation with the tube flange and above such flange, the chute member having a guide slot through which the shanks of screws can depend while the underfaces of their heads are supported by the margins of the chute member bordering on this guide slot and having an outlet from said guide-slot, at one end thereof, and an escapement device comprising an arresting finger and an escapement finger spaced apart lengthwise of the guide-slot, the escapement finger comprising a pair of spaced parallel finger elements, of which the upper is disposed between the chute member and the tube flange, and of which the lower is disposed below the tube flange, the tube having an opening below the flange through which the last said finger element extends, the finger elements each having a cam face disposed in intersecting relation, as viewed in plan, with the guide-slot and movable crosswise and lengthwise thereof towards the outlet, in the movement of the finger elements, so that the finger elements are thereby adapted to engage a screw shank at two positions spaced from the screw head, and provide in combination with the arresting finger positive control of angular position of the so-engaged screw in a vertical plane through the axis of the shank.

3. In a screw-driving machine of the kind comprising a hopper for containing a plurality of screws to be driven, a screw delivery nozzle, a rotary screw-driving spindle assembled co-axially therewith and movable axially therein to engage with and drive screws delivered to such nozzle, and guide means for the screws leading from the hopper to the nozzle, the provision of a delivery control device associated with the guide means for regulating the delivery of screws to the nozzle, and comprising a downwardly inclined chute member having a guide-slot through which the shanks of screws can depend while the underfaces of their heads are supported by the margins of the chute member bordering on this guide-slot, and having an outlet from said guide-slot at one end thereof of enlarged form relatively to the guide-slot, and an escapement device comprising an arresting finger mounted for movement in a path overlapping with the outlet, as viewed in plan, and an escapement finger spaced apart lengthwise of the guide-slot, the escapement finger having at its trailing edge a cam face for promoting feed movement of a released screw towards the outlet, whereby each screw is moved into the outlet while still receiving support from the arresting finger.

4. In a screw-driving machine of the kind comprising a hopper for containing a plurality of screws to be driven, a screw delivery nozzle, a rotary screw-driving spindle assembled co-axially therewith and movable axially therein to engage with and drive screws delivered to such nozzle, and guide means for the screws leading from the hopper to the nozzle, the provision of a delivery control device associated with the guide means for regulating the delivery of screws to the nozzle, and comprising a downwardly inclined chute member having a guide slot through which the shanks of screws can depend while the underfaces of their heads are supported by the margins of the chute member bordering on this guide-slot, and having an outlet from said guide-slot at one end thereof, of enlarged form relatively to the guide-slot and an escapement device comprising an escapement member adapted to be moved back and forth cross-wise of the guide-slot, as viewed in plan, and including an arresting finger and an escapement finger spaced apart lengthwise of the guide-slot, the escapement finger moving across the guide-slot in advance of the outlet and the arresting finger moving across the outlet itself in a direction crosswise of the guide-slot, and having an end edge of a length such that a marginal portion of the arresting finger bordering this edge is situated in overlapping relation with a lateral margin of the outlet when the escapement finger is disposed with its trailing edge across the guide-slot adjacent to the outlet, whereby each screw is moved into the outlet while still receiving support from said marginal portion of the arresting finger.

5. In a screw-driving machine of the kind comprising a hopper for containing a plurality of screws to be driven, a screw delivery nozzle, a screw-driving spindle assembled co-axially therewith and movable axially therein to engage with and drive screws delivered to such nozzle, and guide means for the screws leading from the hopper to the nozzle, comprising a tube having at its upper end an outwardly projecting flange, the provision of a delivery control device associated with the tube for regulating the delivery of screws through it to the nozzle and comprising a downwardly inclined chute member, mounted in spaced generally parallel relation with the tube flange and above such flange, the chute member having a guide-slot through which the shanks of screws can depend while the underfaces of their heads are supported by the margins of the chute member bordering on this guide-slot, the chute member further having an outlet from said guide-slot at one end thereof of enlarged form relatively to the guide-slot, and an escapement device comprising an escapement member adapted to be moved back and forth crosswise of the guide-slot, as viewed in plan, and including an arresting finger and an escapement finger spaced apart lengthwise of the guide-slot, the escapement finger comprising a pair of spaced parallel finger elements, of which the upper is disposed between the chute member and the tube flange, and of which the lower is disposed below the tube flange, the tube having an opening below the flange through which the last said finger element extends, their finger elements each having at the trailing edges a respective cam face disposed in intersecting relation, as viewed in plan, with the guide-slot and movable crosswise and lengthwise thereof towards the outlet in the movement of the finger elements, and the arresting finger moving across the outlet itself in a direction crosswise of the guide-slot, the end being of a length such that a marginal portion bordering on the free end of the arresting finger is situated in overlapping relation with a lateral margin of the outlet when the escapement finger is disposed with its trailing edge across the guide-slot adjacent to the outlet.

6. In a screw-driving machine of the kind comprising a hopper for containing a plurality of screws to be driven, a screw delivery nozzle, a rotary screw-driving spindle assembled co-axially therewith and movable axially therein to engage with and drive screws delivered to such nozzle, and guide means for the screws leading from the hopper to the nozzle, the provision of a delivery control device associated with the guide means and comprising a downwardly inclined chute member having a guide-slot through which the shanks of screws can depend while the underfaces of their heads are supported by the margins of the chute member bordering on this guide-slot, and having an outlet from said guide-slot at one end thereof, an upper wall disposed above and parallel with the chute member and comprising top wall member of predetermined thickness and cross-sectional shape defining in conjunction with the chute member a passageway of a height and cross-sectional shape conforming to the equivalent dimensional characteristics of a particular size and type of screw head, the top wall member being mounted removably to permit of its replacement by another top wall member of different thickness or cross-sectional shape, and an escapement device adapted to regulate the advancement of screws along the passageway and their delivery from the outlet.

7. In a screw-driving machine of the kind comprising a hopper for containing a plurality of screws to be driven, a screw delivery nozzle, a rotary screw-driving spindle assembled co-axially therewith and movable axially therein to engage with and drive screws delivered to such nozzle, and guide means for the screws leading from the hopper to the nozzle, the provision of a delivery control device associated with the guide means and comprising a downwardly inclined chute member having a guide-slot through which the shanks of screws can depend while the underfaces of their heads are supported by the margins of the chute member bordering on the guide-slot, and having an outlet from said guide-slot at one end thereof, an upper wall disposed above and parallel with the chute member and comprising a plate of predetermined thickness and cross-sectional shape defining in conjunction with the chute member a passageway of a height and cross-sectional shape conforming to the equivalent dimensional characteristics of a particular size and type of screw head, the plate being slidably mounted in a guideway of undercut shape in cross-section in the base of the hopper to permit of its replacement by another plate of different thickness or cross-sectional shape, and an escapement device adapted to regulate the advancement of screws along the passageway and their delivery from the outlet.

8. In a screw-driving machine of the kind comprising a hopper for containing a plurality of screws to be driven, a screw delivery nozzle, a rotary screw-driving spindle assembled co-axially therewith and movable axially therein to engage with and drive screws delivered to such nozzle, the provision of guide means leading from the hopper to the spindle, said guide means including an upper guide member mounted below the hopper, the latter having an outlet in register with the upper end of the upper guide member, the guide member comprising a tubular portion of part circular form internally in transverse cross-section and spaced generally parallel plates connected to the extremities of the tubular portion, and a baffle member disposed between said plates and having an inwardly presented face of substantially the same curvature in transverse cross-section as that of the tubular portion, and abutment means on the baffle member engaging on abutment faces on the plates thereby to locate positively the baffle member, firstly as to angular position between and in a plane parallel to the plane of the plates, and secondly as to position in a direction radial to the axis of the tubular portion and in said plane, so that the inwardly presented face of the baffle member is substantially co-incident with the internal face of the tubular portion, and means for releasably retaining the baffle member in its so located position.

9. In a screw-driving machine of the kind comprising a hopper for containing a plurality of screws to be driven, a screw delivery nozzle, a rotary screw-driving spindle assembled co-axially therewith and movable axially therein to engage with and drive screws delivered to such nozzle, the provision of guide means leading from the hopper to the spindle, said guide means including an upper guide member mounted below the hopper, the latter having an outlet in register with the upper end of the upper guide member, the guide member comprising a tubular portion of part circular form internally in transverse cross-section and spaced generally parallel plates connected to the extremities of the tubular portion, and a baffle member disposed between said plates and having an inwardly presented face of substantially the same curvature in transverse cross-section as that of the tubular portion, and extending for nearly the whole length thereof leaving only a short length of the tubular portion unenclosed laterally at the upper end thereof, to provide a clearance for the shanks of screws to be brought into register with the upper end of the tubular portion from a position offset laterally therefrom in the direction of extension of the plates, the baffle member having shoulders adapted to engage the outer edges of the plates and thereby to locate positively locating the baffle member, firstly to angular position between and in a plane parallel to the plane of the wing plates, and secondly as to position in a direction radial to the axis of the tubular portion and in said plane, so that the inwardly presented face of the baffle member is substantially co-incident with the internal face of the tubular portion, and means for releasably retaining the baffle member in its so located position.

10. In a screw-driving machine of the kind comprising a hopper for containing a plurality of screws to be driven, a screw delivery nozzle, a rotary screw-driving spindle assembled co-axially therewith and movable axially therein to engage with and drive screws delivered to such nozzle, means for imparting eccentric motion to the hopper about said spindle, means regulating delivery of screws from the hopper to the nozzle, including upper and lower guide members which are coupled together end-to-end affording respective passageways down which the screws can descend, the upper of said guide members being connected to said hopper whereby it partakes of said eccentric motion thereof and the lower of said guide members co-operating at its lower end with means holding said lower end stationary with said nozzle during operation of the machine, so that the guide members are subjected to a collective gyration at their adjacent coupled ends with axes of their respective passageways oblique to each other; the provision of end faces at said adjacent coupled ends of the guide members, said end faces surrounding the mouths of said passageways at said ends, and means urging said end faces into face-to-face contact.

11. In a screw-driving machine of the kind comprising a hopper for containing a plurality of screws to be driven, a screw delivery nozzle, a rotary screw-driving spindle assembled co-axially therewith and movable axially therein to engage with and drive screws delivered to such nozzle, means for imparting eccentric motion to the hopper about said spindle, means regulating delivery of screws from the hopper to the nozzle, including upper and lower guide members which are coupled together end-to-end affording respective passageways down which the screws can descend, the upper of said guide members being connected to said hopper whereby it partakes of said eccentric motion thereof and the lower of said guide members co-operating at its lower end with means holding said lower end stationary with said nozzle during operation of the machine, so that the guide members are subjected to a collective gyration at their adjacent coupled ends with axes of their respective passageways oblique to each other; the provision of an end face of narrow annular form on the lower of said guide members, an opposed end face on the other of the guide members, and means urging said end faces into face-to-face contact.

12. In a screw-driving machine of the kind comprising a hopper for containing a plurality of screws to be driven, a screw delivery nozzle, a rotary screw-driving spindle assembled co-axially therewith and movable axially therein to engage with and drive screws delivered to such nozzle, means for imparting eccentric motion to the hopper about said spindle, means regulating delivery of screws from the hopper to the nozzle, including upper and lower guide members which are coupled together end-to-end affording respective passageways down which the screws can descend, the upper of said guide members being connected to said hopper whereby it partakes of said eccentric motion thereof and the lower of said guide members co-operating at its lower end with means holding said lower end stationary with said nozzle during operation of the machine, so that the guide members are subjected to a collective gyration at their adjacent coupled ends with axes of their respective passageways oblique to each other; the provision of an end face on the lower of said guide members, said end face including an inner face portion of narrow annular form and an outer face portion of generally frusto-conical form, presenting in combination with said inner face portion, a generally domed end face, and an opposed end face on the other of the guide members in contact with said inner face portion and separated by a relief or clearance space from said outer face portion, and means urging said inner face portion and said opposed end face into said contact with each other.

13. In a screw-driving machine of the kind comprising a hopper for containing a plurality of screws to be driven, a screw delivery nozzle, a rotary screw-driving spindle assembled co-axially therewith and movable axially therein to engage with and drive screws delivered to such nozzle, means for imparting eccentric motion to the hopper about said spindle, means regulating delivery of screws from the hopper to the nozzle, including upper and lower guide members which are coupled together end-to-end affording respective passageways down which the screws can descend, the upper of said guide members being connected to said hopper whereby it partakes of said eccentric motion thereof and the lower of said guide members co-operating at its lower end with means holding said lower end stationary with said nozzle during operation of the machine, so that the guide members are subjected to a collective gyration at their adjacent coupled ends with axes of their respective passageways oblique to each other; the provision of a head part on the lower of the guide members, a sleeve secured to the upper guide member, said head part being a close sliding fit in said sleeve, spring means in said sleeve urging said head part axially towards said upper guide member, a generally domed end face on said head part, an opposed end face on said upper guide member maintained by said spring means in contact with the inner margin of said generally domed end face of said head part, said opposed end face being spaced from the outer margin of said generally domed end face.

References Cited in the file of this patent

UNITED STATES PATENTS

| | | |
|---|---|---|
| 2,554,732 | Doyle | May 29, 1951 |
| 2,657,721 | Shaff | Nov. 3, 1953 |
| 2,706,504 | Moore | Apr. 19, 1955 |
| 2,770,269 | Austin | Nov. 13, 1956 |
| 2,803,274 | Zubal et al. | Aug. 20, 1957 |